United States Patent
Manepalli et al.

(10) Patent No.: US 9,334,549 B2
(45) Date of Patent: May 10, 2016

(54) SYSTEMS AND METHODS FOR RECOVERY OF RARE-EARTH CONSTITUENTS FROM ENVIRONMENTAL BARRIER COATINGS

(71) Applicant: General Electric Company, Schenectady, NY (US)

(72) Inventors: Satya Kishore Manepalli, Bangalore (IN); Theodore Robert Grossman, Cincinnati, OH (US); Don Mark Lipkin, Niskayuna, NY (US); Karthick Vilapakkam Gourishankar, Bangalore (IN); Robert Joseph Lyons, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 118 days.

(21) Appl. No.: 14/137,008

(22) Filed: Dec. 20, 2013

(65) Prior Publication Data
US 2015/0176104 A1    Jun. 25, 2015

(51) Int. Cl.
*C22B 59/00*    (2006.01)

(52) U.S. Cl.
CPC .................... *C22B 59/00* (2013.01)

(58) Field of Classification Search
None
See application file for complete search history.

(56) References Cited

U.S. PATENT DOCUMENTS

| | | |
|---|---|---|
| 2,849,286 A | 8/1958 | Welt et al. |
| 3,054,655 A | 9/1962 | Pawel et al. |
| 3,078,142 A | 2/1963 | Jozef et al. |
| 3,102,783 A | 9/1963 | Leon et al. |
| 3,110,556 A | 11/1963 | Peppard et al. |

(Continued)

FOREIGN PATENT DOCUMENTS

| | | |
|---|---|---|
| CN | 101705380 A | 5/2010 |
| CN | 102242270 A | 11/2011 |

(Continued)

OTHER PUBLICATIONS

Moeller et al., "Observations on the Rare Earths Double Sodium Sulfate Precipitation for Separation of the Terbium and Yttrium Earths", Analytical Chemistry, Volume No. 17, Issue No. 1, pp. 44-45, Jan. 1, 1945.

(Continued)

*Primary Examiner* — Melissa Swain
(74) *Attorney, Agent, or Firm* — John P. Darling (57) ABSTRACT

Systems and methods for recovery of rare-earth constituents from environmental barrier coatings are provided. One method includes extracting rare-earth (RE) oxide constituents from a feedstock containing RE silicates and non-RE contaminants. The method includes leaching the REs from the feedstock into an acid to form an acid solution, performing an oxalate precipitation on the acid solution to form an RE oxalate hydrate, and separating the RE oxalate hydrate from the acid solution. The method also includes heat treating the RE oxalate hydrate to form an RE oxide containing the RE elements extracted from the feedstock.

20 Claims, 7 Drawing Sheets

(56) References Cited

U.S. PATENT DOCUMENTS

| | | |
|---|---|---|
| 3,615,171 A | 10/1971 | Mason et al. |
| 3,647,361 A | 3/1972 | Coltrinari et al. |
| 3,658,486 A | 4/1972 | Goto |
| 4,032,471 A | 6/1977 | Luckey |
| 4,386,056 A | 5/1983 | Heytmeijer |
| 4,432,948 A | 2/1984 | Heytmeijer |
| 5,368,736 A | 11/1994 | Horwitz et al. |
| 5,512,256 A | 4/1996 | Bray et al. |
| 5,643,474 A | 7/1997 | Sangeeta |
| 6,146,692 A | 11/2000 | Sangeeta et al. |
| 6,267,902 B1 | 7/2001 | Cartier et al. |
| 6,974,563 B2 | 12/2005 | Sylvester |
| 7,517,508 B2 | 4/2009 | Bray |
| 7,544,112 B1 | 6/2009 | Miller et al. |
| 7,867,575 B2 | 1/2011 | Boutwell et al. |
| 7,910,172 B2 | 3/2011 | Meschter et al. |
| 8,039,113 B2 | 10/2011 | Kirby et al. |
| 8,039,117 B2 | 10/2011 | Kulkarni et al. |
| 8,137,645 B2 | 3/2012 | Porob et al. |
| 8,273,470 B2 | 9/2012 | Kirby et al. |
| 8,317,896 B2 | 11/2012 | Homma et al. |
| 8,343,589 B2 | 1/2013 | Kirby et al. |
| 8,524,176 B2 | 9/2013 | Thakur |
| 2013/0171047 A1 | 7/2013 | Burlingame et al. |
| 2013/0283977 A1 | 10/2013 | Lakshmanan et al. |

FOREIGN PATENT DOCUMENTS

| | | |
|---|---|---|
| EP | 0116483 A1 | 8/1984 |
| EP | 2444507 A1 | 4/2012 |
| WO | 03104149 A1 | 12/2003 |

OTHER PUBLICATIONS

Misumi et al., "Separation of Yttrium-90 from Strontium-90 and Lanthanum-140 From Barium-140 with Anion Exchange Resin of Carbonate Form", Journal of Inorganic and Nuclear Chemistry, vol. 20, Issue No. 1-2, pp. 127-130, Nov. 1, 1961.

Holleman-Wiberg, "Textbook of Inorganic Chemistry", p. 1267, Jan. 1985 (Unofficial English Translation).

Takahashi et al., "Separation and Recovery of Rare Earth Elements from Phosphor Sludge in Processing Plant of Waste Fluorescent Lamp by Pneumatic Classification and Sulfuric Acidic Leaching", Journal of the Mining and Materials Processing Institute of Japan, vol. 117, Issue No. 7, pp. 579-585, 2001.

PCT Search Report and Written Opinion issued in connection with corresponding Application No. PCT/US2014/070806 on Apr. 21, 2015.

(Y, Yb)-OXALATE

MASS BALANCE DATA FROM 1900g BATCH

| OXIDES | OVERSPRAY POWDER (g) | OVERSPRAY POWDER (Wt%) | $SiO_2$ RESIDUE (g) | $SiO_2$ RESIDUE (Wt%) | RE-OXIDE (g) | RE-OXIDE (Wt%) |
|---|---|---|---|---|---|---|
| $Y_2O_3$ | 595 | 32.2 | 26 | 4.0 | 546 | 46.1 |
| $Yb_2O_3$ | 686 | 37.2 | 31 | 4.9 | 638 | 53.8 |
| $SiO_2$ | 516 | 28.0 | 545 | 85.9 | - | - |
| $Al_2O_3$ | 7.59 | 0.4115 | 1.65 | 0.2599 | 0.05 | 0.0044 |
| BaO | 3.80 | 0.2058 | 0.07 | 0.0110 | 0.06 | 0.0052 |
| SrO | 0.66 | 0.0360 | 0.08 | 0.0120 | 0.11 | 0.0092 |

FIG. 6

PURITY OF RE- OXIDE FROM 1900g BATCH
ELEMENTS: Wt%

| ELEMENT | ACID LEACHED FILTRATE (Wt%) | RE- OXIDE (Wt%) |
|---|---|---|
| Y | 42.9 | 43.4 |
| Yb | 55.5 | 56.5 |
| Al | 0.3131 | 0.0028 |
| Ba | 0.3014 | 0.0056 |
| Sr | 0.0662 | 0.0093 |
| Ca | 0.0140 | 0.0042 |
| Co | 0.0792 | 0.0018 |
| Cr | 0.1806 | 0.0007 |
| Fe | 0.0520 | 0.0012 |
| Ni | 0.6093 | 0.0202 |
| Na | 0.0066 | 0.0332 |
| S | 0.0013 | 0.0268 |

FIG. 7

SYSTEMS AND METHODS FOR RECOVERY OF RARE-EARTH CONSTITUENTS FROM ENVIRONMENTAL BARRIER COATINGS

BACKGROUND

Silicon-containing materials, such as, for example, monolithic ceramics, alloys, intermetallics, and composites thereof have desirable properties for use in structures designed for service at high temperatures in such applications as aeronautical and industrial gas turbine engines, heat exchangers, and internal combustion engines. Environmental barrier coatings (EBCs) are applied to silicon-containing materials to protect the materials from harmful exposure to chemical environments and excessive thermal loads. Thus, EBCs are designed to be thermochemically stable in high-temperature, water vapor-containing environments and minimize interconnected porosity and vertical cracks which provide exposure paths between the material surface and the environment.

EBCs can be single-layer or multi-layer systems, with each layer serving at least one function, such as to provide a thermal barrier, mitigate substrate oxidation or volatilization, or prevent chemical reaction with adjacent layers or the substrate. In many EBC systems, at least one layer is substantially formed from a RE silicate, where the RE includes one or more of the elements Yttrium (Y), Ytterbium (Yb), Holmium (Ho), Thulium (Tm), and Lutetium (Lu). The RE silicates can be, for example, RE monosilicates ($RE_2SiO_5$) and RE disilicates ($RE_2Si_2O_7$). RE silicates have relatively low rates of silica volatilization in combustion atmospheres, low thermal conductivity and excellent thermomechanical compatibility with the above mentioned silicon-containing substrates.

EBC materials can be deposited onto components using a range of coating processes, including thermal spraying (e.g., combustion or plasma spraying), slurry-based deposition (e.g., slurry spraying, dipping, electrophoretic deposition), chemical vapor deposition and physical vapor deposition.

During fabrication or application of the EBC, a large amount of the RE containing silicates is lost as manufacturing scrap. For example, for thermally sprayed EBC layers, as much as 90% of the feedstock powder can be lost to overspray, non-sticking particles, or deposited on tooling fixtures. Collection of this scrap typically results in co-mingling of the high-value, RE-containing material with other, low-value constituents or contaminants. These can include elemental silicon (Si) and silicates of Barium (Ba), Strontium (Sr), and Aluminum (Al) (e.g., such as found in barium-strontium-aluminosilicate (BSAS)).

A similar problem arises with end-of-use EBC-coated components. The coatings can be stripped from these components by processes such as abrasive grit blasting, resulting in a comingled mixture of the abrasive medium, RE silicates, silicates containing Ba/Sr/Al, elemental Si, silicon dioxide, and other impurities resulting from engine operation or the stripping process.

Currently, REs cannot be efficiently recovered from EBC overspray powders, EBC slurry deposition processing, and stripped EBC coatings.

BRIEF DESCRIPTION

In one embodiment, a method for extracting rare-earth (RE) oxide constituents from a feedstock containing RE silicates and non-RE contaminants is provided. The method includes leaching the REs from the feedstock into an acid to form an acid solution, performing an oxalate precipitation on the acid solution to form an RE oxalate hydrate, and separating the RE oxalate hydrate from the acid solution. The method also includes heat treating the RE oxalate hydrate to form an RE oxide containing the RE elements extracted from the feedstock.

In another embodiment, a system is provided having a collection and recovery system configured to perform the method described above.

DETAILED DESCRIPTION

Various embodiments will be better understood when read in conjunction with the appended drawings. To the extent that the figures illustrate diagrams of the functional or operational blocks of various embodiments, the functional blocks are not necessarily indicative of the division between components or steps. Thus, for example, one or more of the functional blocks may be implemented in a single component or process, or multiple components or processes. It should be understood that the various embodiments are not limited to the arrangements and instrumentality shown in the drawings.

As used herein, the terms "system," "unit," or "module" such as the controllers described herein may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide a chemical process to extract or separate rare-earth (RE) constituents or elements from low-value constituents so as to recover a high-purity, RE-containing product that can subsequently be returned into high-value use, such as for EBCs. The separation process in some embodiments is configured for the separation of Yttrium (Y) and Ytterbium (Yb) from a feedstock containing Barium (Ba), Strontium (Sr), Aluminum (Al), and Silicon (Si). However, it should be appreciated that in various embodiments the EBC may contain Ba+Sr+Al+Si+others, Al+Si+others, Si+others, or other combinations, as well as different amounts and/or ranges of contaminants including organics and metals.

By practicing at least one embodiment described herein, the efficient recovery of high-value RE constituents from EBC scrap collected during the application process and coating stripping may be provided.

Figure 1:
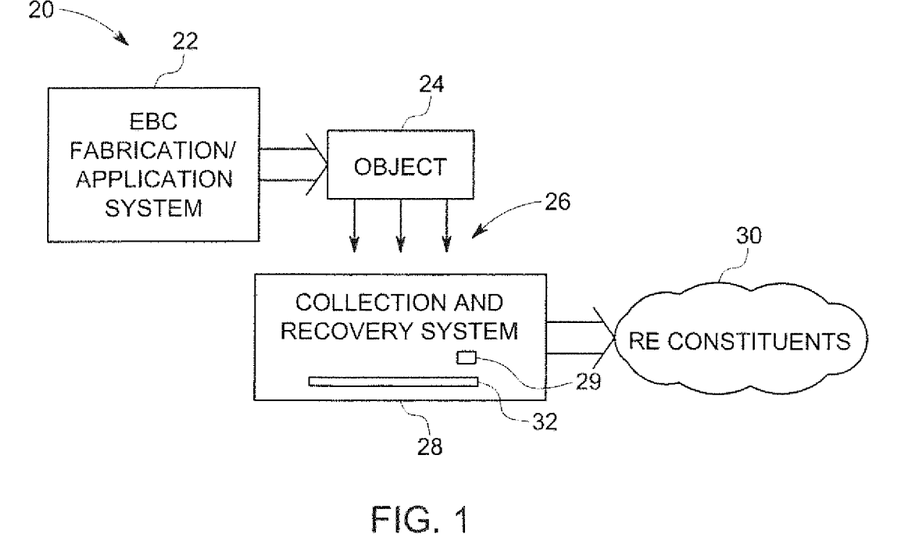
FIG. 1 is a block diagram of system for collection and recovery of environmental barrier coatings (EBC) scrap in accordance with various embodiments.

FIG. 1 is a block diagram of a system 20 in accordance with various embodiments that allows for the collection and recovery of RE constituents after an EBC application process. In particular, an EBC fabrication/application system 22 provides for fabricating and/or applying an EBC to an object 24. For example, the object 24 may be a silicon-bearing material with the EBC fabrication/application system 22 applying an EBC thereto as known in the art, such as using a plasma spraying process. However, any method in the art may be used to apply the EBC to the object, for example, thermal spraying (e.g., combustion or plasma spraying), slurry-based deposition (e.g., slurry spraying, dipping, electrophoretic deposition), chemical vapor deposition and physical vapor deposition. Additionally, the object 24 may be any object and is not limited to an object formed from a silicon-bearing material. The object may be, for example, a gas turbine component. In some embodiments, and as another example, the object 24 may be an object formed from a ceramic matrix composite (CMC) substrate material, for example, for use in aeronautical and industrial gas turbine engines, heat exchangers, and internal combustion engines, among others.

Additionally, the EBC applied to the object 24 by the EBC fabrication/application system 22 may be any type of RE-containing EBC. In one embodiment, the EBC and contaminants to be separated comprise the following compound(s) or composition(s) as defined by the following chemical formulae (illustrating the constituents of one or more exemplary embodiments): $(Y,Yb)_2Si_2O_7$ (YbYDS), $Y_2SiO_5$ (YMS), $(Ba,Sr)Si_2Al_2O_8$ (BSAS), Si. However, it should be appreciated that other compounds or compositions may form part of the EBC or the input feedstock for recycling. For example, the contaminants may include compounds such as but not limited to $SiO_2$, $Al_2O_3$, $Fe_2O_3$, $Fe3O4$, $Y_2O_3$-stabilized $ZrO_2$, (Ni, Co)CrAlY, and organic compounds. For example, the EBC may be a sintering resistant, low conductivity, high stability EBC/TBC as described in U.S. Pat. No. 7,867,575. As another example, a component having an EBC may be formed as described in U.S. Pat. No. 7,910,172. Other examples are described in U.S. Pat. Nos. 8,343,589, 8,273,470, 8,039,113. In some embodiments, the feedstock may comprise at least one of Yttrium (Y) or Ytterbium (Yb) in the form of at least one of $RE_2Si_2O_7$ (REDS) or $RE_2SiO_5$ (REMS). It should be noted that when reference is made herein to at least one of "A" or "B" this means at least one of A, or at least one of B, or at least one of A and at least one of B. For example, at least one of Y or Yb includes: Y, or Yb, or Y and Yb. In some embodiments, the feedstock is a non-deposited feedstock powder including at least one of REDS or REMS and at least one of $(Ba,Sr)Si_2Al_2O_8$ (BSAS) or Si, and wherein at least the Si, Ba, Sr, and Al are removed from the non-deposited feedstock powder. In some embodiments, the feedstock comprises Yttrium (Y) and Ytterbium (Yb) in the form of YbYDS, and the RE elements extracted from the feedstock comprise a mixed $(Yb,Y)_2O_3$. In some embodiments, the feedstock comprises at least one of Yttrium (Y) and Ytterbium (Yb) in the form of YbYDS and having the Y and Yb extracted and recovered therefrom at greater than about 90% yield with each of a plurality of contaminants reduced to less than 100 ppm.

As illustrated in FIG. 1, when applying the EBC (or TBC) to the object 24, for example by thermally spraying EBC layers on the object 24, all of the feedstock powder does not deposit onto the surface of the object 24. Depending on the geometry of the object being coated, the process parameters and tooling/fixturing used, in excess of 90% of the feedstock powder may not deposit on the object 14. In particular, the non-deposited feedstock powder can be lost as overspray powder, bounce off the part as non-sticking particles, or deposit as a coating on tooling fixtures, as illustrated by the arrows 26. In these processes, the RE-containing feedstock powder becomes mixed with contaminants as well as with other components of the coating, such as elemental silicon (Si) and silicates of Barium (Ba), Strontium (Sr), and Aluminum (Al).

In various embodiments, a collection and recovery system 28 is provided to collect and recover the non-deposited RE-containing feedstock. In particular, the collection and recovery system 28 collects the mixed non-deposited feedstock powder and contaminants and separates for recovery the RE constituents 30 from the low-value constituents and contaminants. In various embodiments, the collection and recovery system 28 includes a holding or storage area 32 where non-deposited feedstock powder is captured and held. For example, the non-deposited feedstock powder may fall into the holding or storage area 32 by gravitational forces or in some embodiments, other forces may be applied (e.g., a vacuum or suction force, such as using a cyclone, or by generating airflow from a fan, or an electrostatic force). The collected non-deposited feedstock powder is then processed as described in more detail herein to separate and recover the RE constituents 30 in a purity and form that facilitates reuse in high-value applications, including but not limited to EBCs.

In various embodiments, a feedstock preparation step may be performed prior to the chemical extraction process described herein. For example, in various embodiments, powder or coating collected from the collection and recovery system 28 is comminuted, such as by milling, to decrease the particle size and also to break up big agglomerates. Additionally, some upgrading of the rare-earth constituents in the feedstock may be provided using techniques such as screening to remove large contaminants (e.g., masking materials, machining chips, or organic debris), magnetic separation to remove highly magnetic impurities (e.g., metals or iron oxides), or gravimetric separation to remove low-density or high-density contaminants.

In various embodiments, the collection and recovery system 28 is used to perform a chemical extraction of REs from EBCs, such as the non-deposited feedstock powder. For example, in one embodiment, the collection and recovery system 28 provides Y,Yb oxide recovery from a mixed EBC feedstock containing Y, Yb, Si, Ba, Sr, Al in oxide form.

Figure 2:
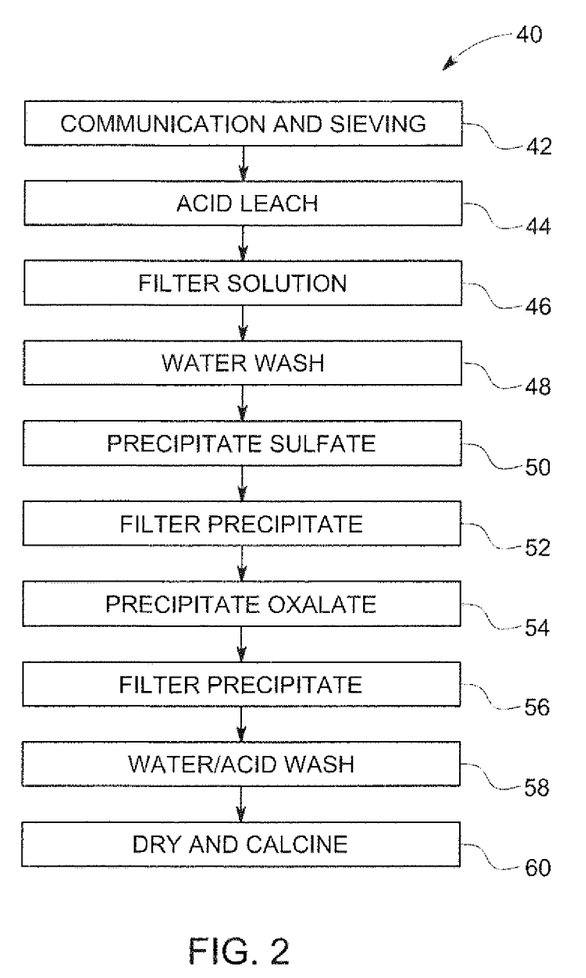
FIG. 2 is a flowchart of method in accordance with one embodiment for chemical extraction of rare-earth (RE) elements from environmental barrier coatings (EBCs).

Various embodiments provide a separation and recovery method or process such as illustrated in FIG. 2 for the chemical extraction of REs from EBCs, which in some embodiments is the extraction of Y and Yb from EBCs. However, it should be appreciated that other REs may be separated and recovered and FIG. 2 is illustrative of one type of chemical extraction process that may be performed. In particular, a method 40 is provided in accordance with various embodiments for performing the chemical extraction.

It should be noted that the method 40 may employ structures or aspects of different embodiments discussed, such as may be performed by the collection and recovery system 28 (shown in FIG. 1). In various embodiments, certain steps may be omitted or added, certain steps may be combined, certain steps may be performed simultaneously, or concurrently, certain steps may be split into multiple steps, certain steps may be performed in a different order, or certain steps or series of steps may be re-performed in an iterative fashion. Reference to FIG. 2 will now be made in connection with the description below. It also should be noted that a general description of the chemical extraction process will first be described followed by specific examples.

In particular, the method 40 includes a communition and/or sieving process at 42. For example, powder collected from the collection and recovery system 28 (shown in FIG. 1) is comminuted, such as by milling, to decrease the particle size and also to break up big agglomerates. Additionally or alternatively, sieving may be performed to initially remove some contaminants. For example, some upgrading of the rare-earth constituents in the feedstock may be provided using techniques such as screening to remove large contaminants (e.g., masking materials, machining chips, or organic debris), magnetic separation to remove highly magnetic impurities (e.g., metals or iron oxides), or gravimetric separation to remove low-density or high-density contaminants.

The method 40 also includes an acid leach at 44. For example, the non-deposited feedstock powder described in connection with FIG. 1 may be treated with concentrated hydrochloric acid (HCl). In this step, the acid solution causes the leaching of the RE elements into the acid solution and results in a silica-rich residue. For example, using an acid leach process, Si and $SiO_2$ may be removed from the solution by subsequent filtering at 46. In various embodiments, the acid leach at 44 causes the leaching of Y, Yb, Ba, Sr, and Al into the acid solution. It should be noted that different acids, such as HCl, $HNO_3$, $H_2SO_4$ and mixtures thereof may be used to leach RE elements from RE silicate containing feedstock. Further, it should be noted that acids having different pH levels may be used as desired or needed for leaching REs from EBC powders. In addition, other high temperature solid state reactions can be used to leach RE, for example, reacting the EBC powders with molten salt halides.

In some embodiments, if needed or desired, elemental Si impurities can be optionally selectively leached by a NaOH solution treatment before performing the acid leach at 44. In particular, Si forms a water soluble complex by reacting with NaOH, whereas RE silicates do not react with NaOH. It should be noted, for example, in embodiments wherein the RE silicates contain only Si as contaminant, NaOH treatment is sufficient to provide pure RE-silicates.

Thereafter, in the method 40, the solution is filtered at 46. For example, in some embodiments, after the acid leach, the solution is filtered to separate a $SiO_2$-rich residue from the acid solution containing the RE elements. Optionally, the $SiO_2$-rich residue is washed at 48 with water to recover additional RE elements in solution.

In embodiments where contaminants such as Ba and Sr are to be removed, the method 40 optionally precipitates the sulfate at 50, in particular, performing a sulfate precipitation process on the filtered acid solution. Alternatively, the sulfate precipitation process can be performed prior to the filtering step at 46.

In various embodiments, a sulfate precipitating reagent such as $Na_2SO_4$, $(NH_4)_2SO_4$, or $H_2SO_4$ is added to the filtered acid solution at 52. In an example embodiment, $Na_2SO_4$ is dissolved in water and stirred into the filtered acid solution at room temperature. The addition of the sulfate to the filtered acid solution containing Ba and Sr cations results in the formation of a white precipitate, $(Ba,Sr)SO_4$. Thus, Ba and Sr may be removed from the dissolved EBC or EBC feedstock powder. For example, the sulfate precipitate may be separated by filtration at 52, such as known in the art. Alternatively, the sulfate precipitation step (at 50) can be performed prior to filtering at 46 and the sulfate precipitate can be removed simultaneously with the silica-rich precipitate at the filtering step (at 46). It should be noted that the precipitate in various embodiments includes one or more alkaline earth or alkali metals.

At the end of the sulfate precipitation at 50, the filtrate solution includes and is rich in Y, Yb, and may contain small amounts of impurity elements such as Al and Sr. Thereafter, an oxalate precipitation is performed at 54. For example, from the acidic solution resulting from filtering the precipitate therefrom at 52, Y and Yb are separated as oxalates by adding an oxalic acid solution, which in one embodiment forms $RE_2(C_2O_4)_3 \cdot nH_2O$.

In various embodiments, an oxalic acid solution is formed by pre-dissolving solid oxalic acid in water, although oxalic acid can be added directly into the acid solution. The addition of oxalic acid solution to the above filtrate solution can be performed at room temperature in various embodiments and results in the formation of an oxalate hydrate precipitate. For example, step 54 selectively precipitates RE elements, such as Y and Yb, while impurity elements such as Al, Sr, and/or other transition-metal impurities (such as other transition elements) do not precipitate as oxalates in acidic conditions and thus remain in solution. Thereafter, the precipitate may be filtered at 56 enabling the separation of high-purity RE product from impurities such as Al and Sr by filtering methods, such as known in the art. It should be noted that other precipitating reagents, such as hydroxides, may be used to selectively precipitate RE from solution. For example, in one embodiment, NaOH is used to precipitate RE as RE-hydroxides.

In one embodiment, the solid product from step 56 is washed at 58 with water, followed by an additional step of acid wash. For example, optionally or alternatively to the water washing, an acid wash may be performed. In particular, to separate or remove, for example, residual Sr, an acid wash may be performed, such as by adding diluted HCl solution to the precipitate. It should be noted that if step 58 is performed, a final filter step is performed to remove excess water/acid before step 60.

Figure 3:
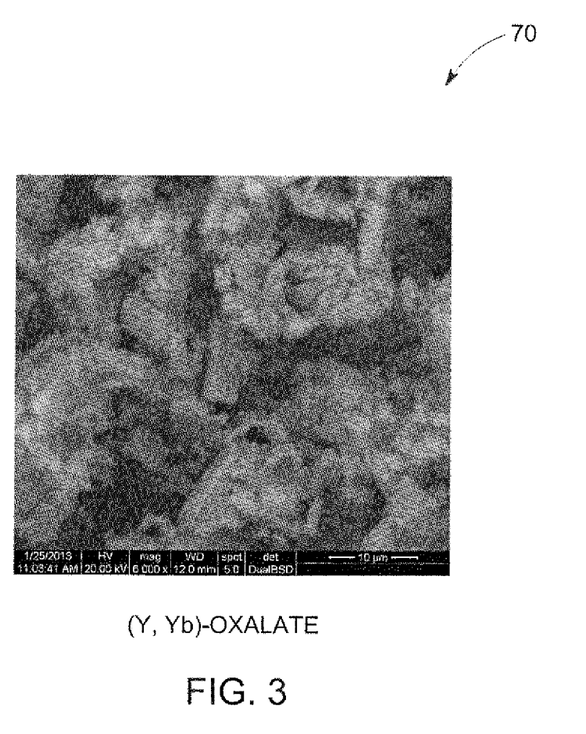
FIG. 3 is a scanning electron microscope (SEM) image of an oxalate hydrate resulting from the method of FIG. 2.

Accordingly, after removing the Si, Ba, Sr, Al and optionally other impurities, a hydrated oxalate of Y and Yb remains after performing step 58. For example, an image 70 of a (Y,Yb) oxalate hydrate resulting from the herein described method or process is shown in FIG. 3. A drying and calcination heat treatment is then performed at 60 on the resultant product. For example, the (Y,Yb)-oxalate hydrate is dried in an oven (e.g., at 100° C. for 15 hours) to remove some or all of the water. Then, the dried product in various embodiments is further heated (e.g., at 800° C. for 5 hours), resulting in an oxide containing Y and Yb. In particular, in the illustrated embodiments, a high-purity $(Y,Yb)_2O_3$ results, which is the product of extraction of the REs from EBCs and un-deposited feedstock powder. It should be noted that the formation of the oxide containing Y and Yb may be performed using other processes known in the art. It should also be noted that $Y_2O_3$ and $Yb_2O_3$ may be extracted from the mixed oxide $(Y,Yb)_2O_3$ using further chemical processes known in the art (e.g., solvent extraction).

It also should be noted that the method 40 is performed to extract REs (e.g., Y and Yb) from EBCs and un-deposited feedstock powder, in particular, to separate from the non-RE alloying elements (e.g., Si, Al, Ba, Sr) and contaminants mixed with these EBCs and un-deposited feedstock powders. However, variations and modifications are contemplated. For example, other REs may be extracted from EBCs and other RE-containing scrap materials following the method 40 with minor modification.

Examples

One particular example of the chemical extraction of REs will now be described. In this example, Y and Yb are extracted from an EBC feedstock powder comprising $(Y,Yb)_2Si_2O_7$ (YbYDS), $Y_2SiO_5$ (YMS), $(Ba,Sr)Si_2Al_2O_8$ (BSAS), Si and other minor organic and inorganic impurities. In the illustrated embodiment, a 10-gram batch of EBC overspray powder was processed using chemical extraction as described below. However, other size batches may be processed with the corresponding parameters adjusted accordingly.

In particular, 10 g of EBC overspray powder was treated with 35 wt % concentrated HCl (25 ml) at 75° C. for 24 hours. The acid treatment causes leaching of Y, Yb, Ba, Sr, and Al into the acid solution. It should be noted that in various embodiments the treatment may be defined, for example, by molar ratios, such as a molar ratio of HCl to (RE+alkaline earth elements+transition metal elements+Al) is between 3 and 10, which in some embodiments, is between 3 and 6 or between 3 and 4.5.

After the acid treatment, the solution was filtered and washed with 100 mL of distilled water. The residue was mainly $SiO_2$ with small amounts of un-reacted YbYDS. In the next step, 0.5 g of $Na_2SO_4$ was dissolved in 10 ml water and this solution was added to the acid solution containing the cations. The mixture was stirred for 60 minutes at room temperature. In other embodiments, for example, 0.4 g of $(NH_4)_2SO_4$ was dissolved in 10 ml water and this solution was added to the acid solution containing all the cations with stirring at room temperature. The sulfate treatment resulted in the formation of a white precipitate, which was subsequently identified as $(Ba,Sr)SO_4$, and this precipitate was removed by filtration. At the end of this sulfate precipitation step, the filtrate solution was rich in Y, Yb, and Al with small quantities of Sr. From this acidic solution, Y and Yb were further separated as oxalates by adding oxalic acid solution. Oxalic acid solution was made by dissolving 8 g of solid oxalic acid in 80 ml water. In other embodiments, oxalic acid powder may be added directly to the acid solution. Addition of oxalic acid solution at room temperature to the above filtrate solution resulted in the formation of white precipitate. The mixture was further stirred at room temperature for one hour, followed by filtration and washing with 300 mL of distilled water. It should be noted that the molar ratio of sulfate to alkaline earth elements should be between 1 and 4 in various embodiment, such as between 1.5 and 2 in some embodiments, and 1 to 1.2 in other embodiments. The molar ratio of oxalic acid to RE elements should be between 1.5 and 3 in various embodiments, and between 1.5 and 2.25 in some embodiments, and 1.5 to 1.8 in other embodiments.

Aluminum and strontium do not precipitate as oxalates under acidic conditions and hence these ions were removed in the filtrate. The obtained product, which was subsequently identified as (Y,Yb) oxalate dihydrate, was dried in an oven at 100° C. for fifteen hours. The dried product was calcined in air at 800° C. for five hours, which resulted in the formation of a mixed $(Y,Yb)_2O_3$, as confirmed by x-ray diffraction.

It should be noted that different parameters, such as different temperatures, amount of liquids or solids, and time periods may be used. Additionally, in some embodiments, the values of reagents used may be slightly higher or lower, such that the values described are approximate. It should also be noted that the drying and calcination steps may be combined, performed at different temperatures and for different time periods in other embodiments.

Figure 4:
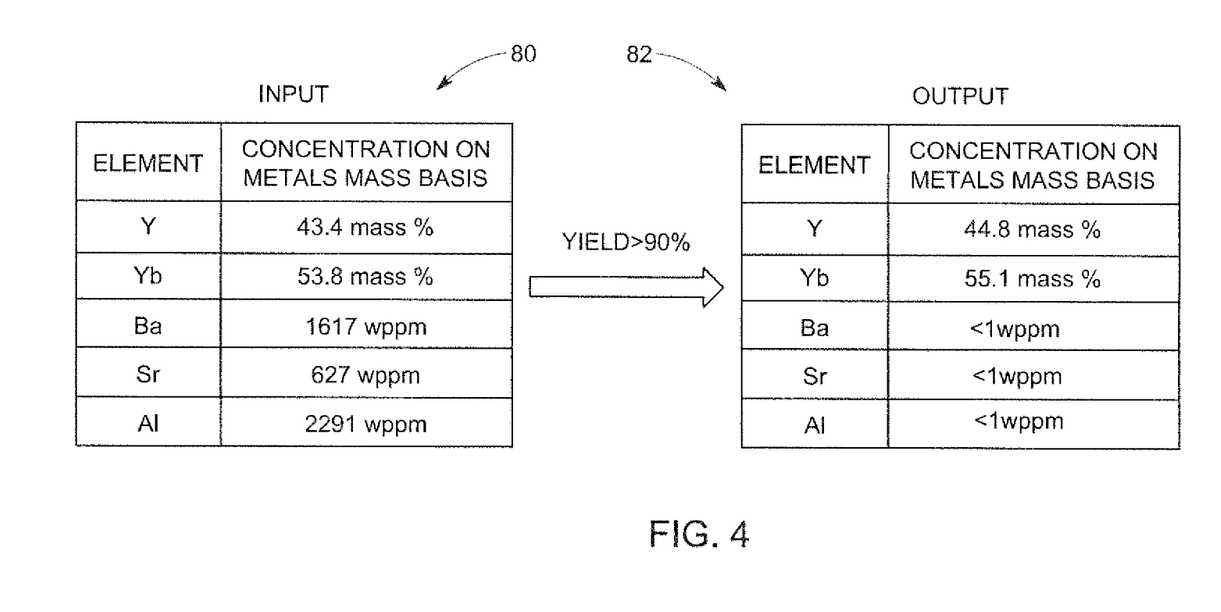
FIG. 4 is tabulated results from the chemical process of FIG. 2.

The results from the processing in the above example are shown in tables 80 and 82 of FIG. 4, which list the composition of the input and the output products, respectively. As can be seen, the yield of Y and Yb extracted and recovered is greater than 90%, while the non-RE elements (e.g., Si, Ba, Sr, Al) are reduced to quantities that do not affect the quality of the output product.

Another example of chemical extraction of REs from EBC overspray powders will now be described as shown in the mass balance flow diagram of FIG. 5. In this example, Y and Yb are also extracted from the EBC powders comprising $(Y,Yb)_2Si_2O_7$ (YbYDS), $Y_2SiO_5$ (YMS), $(Ba,Sr)Si_2Al_2O_8$ (BSAS) and other impurities such as YSZ, NiCrAlY, Co, and Fe, among others. In the illustrated embodiment, a 1900 gram batch of feedstock was processed using chemical extraction as described below. However, it should be understood that other size batches may be processed with the corresponding parameters adjusted to scale accordingly.

In particular, 1900 g of YbYDS was treated with 5 liters of 30 wt % concentrated HCl at 85° C. for 24 hours, as illustrated at 92. The mixture was stirred using an impeller inside an oil-jacketed vertical reactor. The acid treatment causes leaching of Y, Yb, Ba, Sr, Al and other elemental contaminants into the acid solution as illustrated at 94, while leaving behind a $SiO_2$-rich residue.

Figure 5:
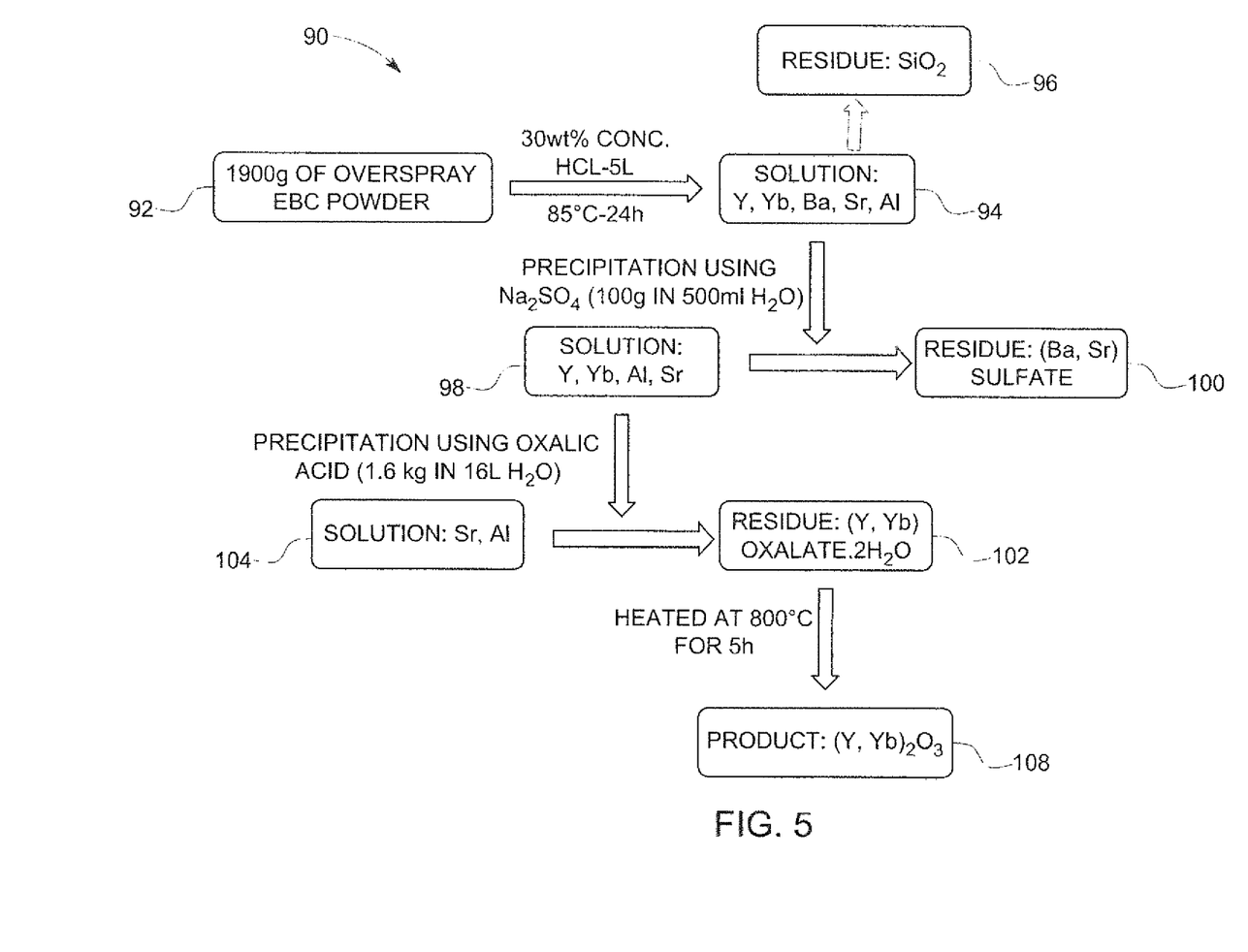
FIG. 5 is a flow diagram illustrating chemical extraction of RE elements from EBCs in accordance with an embodiment.

After the acid treatment, the solution was filtered and washed with 4 liters of distilled water (not shown in FIG. 5). The residue was mainly $SiO_2$, as illustrated at 96, with small amounts of un-reacted YbYDS. In total, approximately 634 g of $SiO_2$ were recovered in 96. In the next step, 100 g of $Na_2SO_4$ dissolved in 500 ml water was added to the acid solution and the solution was stirred for 60 minutes at room temperature.

The sulfate treatment resulted in the formation of white precipitate, which was subsequently identified as $(Ba,Sr)SO_4$, and this precipitate was removed by filtration as illustrated at 100. At the end of this sulfate precipitation step, the remaining filtrate solution was rich in Y, Yb, and Al with small quantities of Sr and other impurities, as illustrated at 98.

From this acidic filtrate solution, Y and Yb were separated as oxalates (from the Al, Sr and other impurities illustrated at 104), by adding oxalic acid solution. Oxalic acid solution was made by dissolving 1600 g of solid oxalic acid in 16 liters of water. The oxalic acid solution was added at room temperature to the above filtrate solution and stirred for 60 minutes, resulting in the formation of white precipitate, which was subsequently identified as (Y,Yb) oxalate hydrate, as illustrated at 102. This precipitate was further washed with 4.5 liters of water at room temperature, followed by final filtration. In total, approximately 3277 g of wet (Y,Yb) oxalate hydrate were recovered at 102.

The (Y,Yb) oxalate hydrate, illustrated at 102, was dried in an oven at 80° C. for fifteen hours and air calcined at 800° C. for five hours, which resulted in the formation of a high-purity mixed $(Y,Yb)_2O_3$, illustrated at 108. In total, approximately 1220 g of $(Y,Yb)_2O_3$ were recovered at 108.

Figure 6:
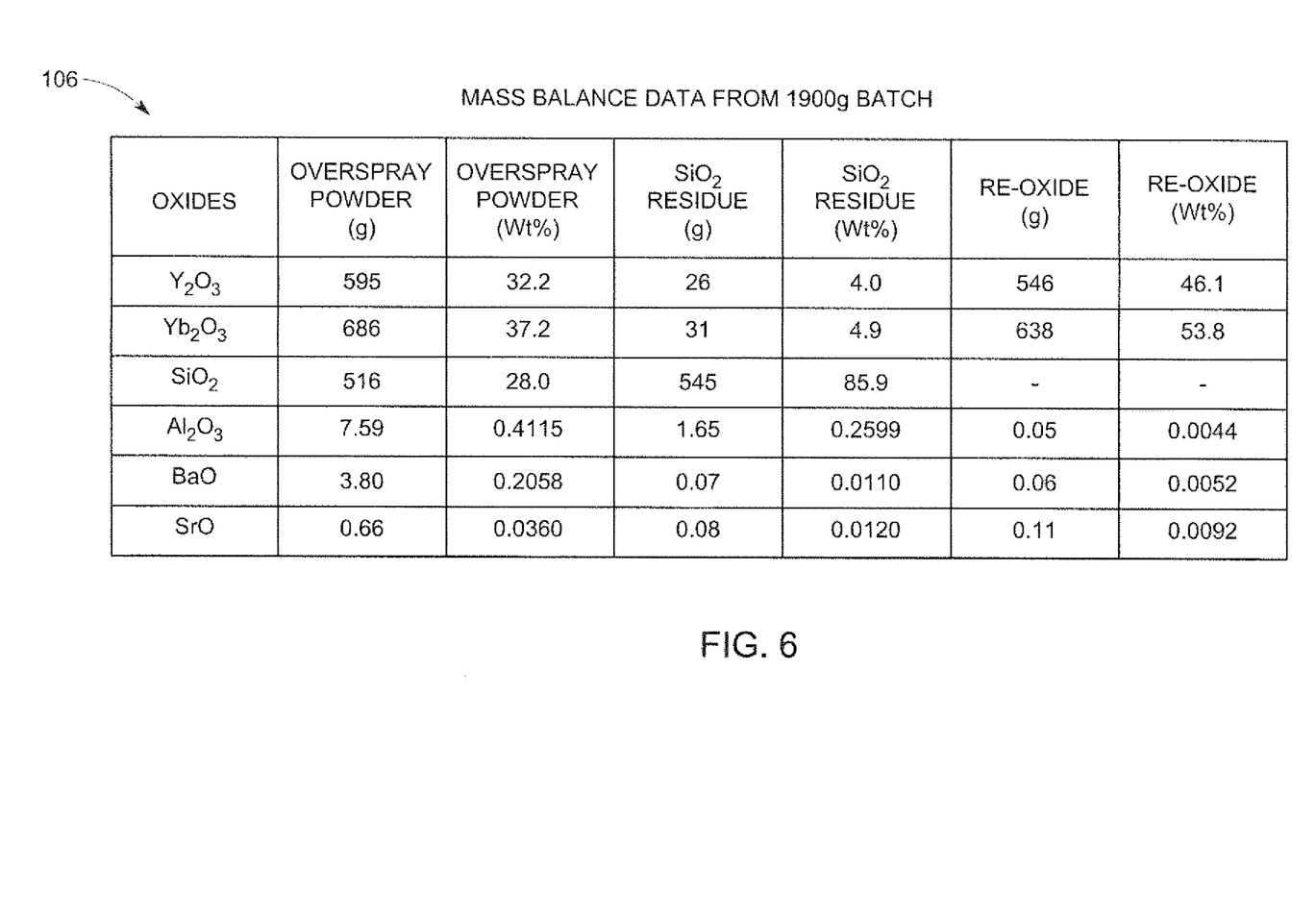
FIGS. 6 and 7 are tabulated results from the chemical process of FIG. 5.
Figure 7:
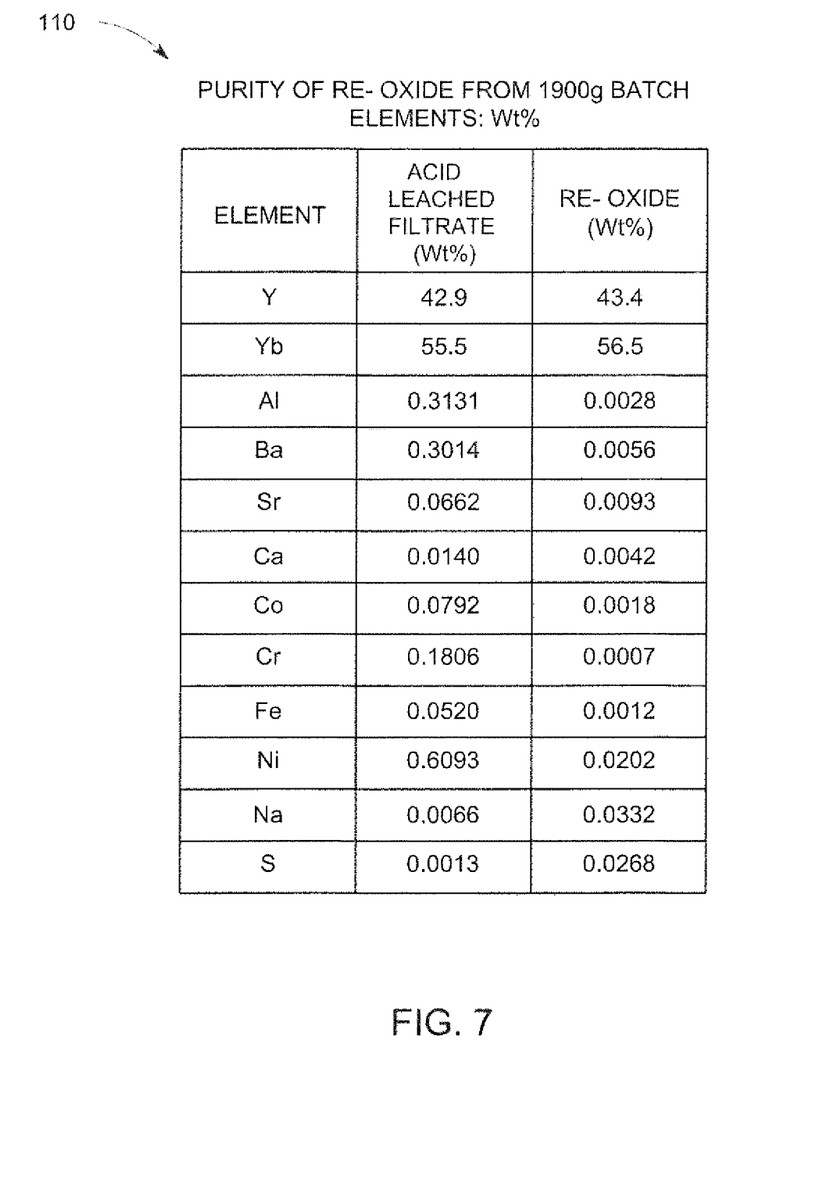

In FIG. 6, the table 106 shows the mass balance of the starting EBC overspray powder and the recovered RE-oxide, where overspray powder refers to the feedstock at 92, SiO2 residue refers to 96 and RE oxide refers to 108. The table 110 of FIG. 7 shows the elemental concentration of the major, minor, and trace impurity elements present in the starting acid leached solution at 94 and RE-oxide 108. As can be seen from FIG. 6, the yield of Y and Yb extracted and recovered is at least 93%, with all of the major contaminants (Si, Ba, Sr, Al) reduced to quantities that do not affect the quality of the output product.

Thus, various embodiments allow for extracting high-purity RE oxides from deposited EBCs and un-deposited EBC feedstock powder. It should be noted that other contaminants, such as Ca, Co, Cr, Fe, Ni and Zr, if present in the overspray powder, are also substantially reduced by following the processes described herein (for example the method 40 shown in FIG. 2).

It should be noted that the various processes performed herein may be controlled manually, automatically, or by a combination thereof. For example, in one embodiment, the collection and recovery system 28 may include a controller 29 that controls the steps of various embodiments described herein, such as the chemical extraction process. For example, the controller 29 may control the amount of different fluids or duration of time for processing in the steps of various embodiments. In some embodiments, user intervention or input may be provided.

Thus, it should be noted that while the examples provided herein describe non-automated processes, these processes and methods are readily amenable to automation, such as but not limited to weighing, mixing, rinsing and filtering. Furthermore, while the examples of processes and methods disclosed above are batch processes, the processes and methods are readily amenable to continuous or semi-continuous unit operations using methods and processes known in the art.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of various embodiments, they are by no means limiting and are only example embodiments. Many other embodiments will be apparent to those of skill in the art upon reviewing the above description. The scope of the present application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for extracting rare-earth (RE) oxide constituents from a feedstock containing RE silicates and non-RE contaminants, wherein the feedstock comprises at least one of Yttrium (Y) or Ytterbium (Yb) in the form of at least one of $RE_2Si_2O_7$ (REDS) or $RE_2SiO_5$ (REMS), the method comprising:

leaching the REs from the feedstock into an acid to form an acid solution;

performing an oxalate precipitation on the acid solution to form an RE oxalate hydrate;

separating the RE oxalate hydrate from the acid solution; and heat treating the RE oxalate hydrate to form an RE oxide containing the RE elements extracted from the feedstock, wherein the leaching comprises treatment with hydrochloric (HCl) acid, resulting in a residue of substantially Silicon dioxide ($SiO_2$).

2. The method of claim 1, where separating the RE oxalate hydrate from the acid solution comprises filtering and washing the RE oxalate hydrate.

3. The method of claim 1, further comprising performing a sulfate precipitation on the acid solution and separating the sulfate precipitates from the acid solution prior to performing the oxalate precipitation.

4. The method of claim 1, further performing sulfate precipitation in the acid solution, wherein the sulfate precipitation comprises adding one of $Na_2SO_4$ or $(NH_4)_2SO_4$ to the acid solution to form a precipitate and separating the precipitate from the acid solution prior to oxalate precipitation, wherein the precipitate contains at least one of alkaline earth metals or alkali metals.

5. The method of claim 4, wherein the precipitate is $(Ba,Sr)SO_4$.

6. The method of claim 5, further comprising removing the $(Ba,Sr)SO_4$ precipitate by filtration.

7. The method of claim 1, wherein performing the oxalate precipitation on the acid solution comprises adding oxalic acid as a solid or in aqueous solution so as to form a RE oxalate hydrate precipitate.

8. The method of claim 7, wherein the oxalic acid solution is added at room temperature while stirring and further comprising washing of the RE oxalate hydrate with water after a first filtration, and thereafter performing a second filtration.

9. The method of claim 1, wherein the feedstock is a non-deposited feedstock powder and further comprises at least one of $(Ba,Sr)Si_2Al_2O_8$ (BSAS) or Si, and wherein at least one of the Si, Ba, Sr, or Al are removed from the non-deposited feedstock powder.

10. The method of claim 1, wherein the feedstock comprises Yttrium (Y) and Ytterbium (Yb) in the form of YbYDS, and the RE elements extracted from the feedstock comprise a mixed $(Yb,Y)_2O_3$.

11. The method of claim 1, wherein the feedstock comprises at least one of Yttrium (Y) or Ytterbium (Yb) in the form of REDS and having at least one of the Y or Yb extracted and recovered therefrom at greater than about 90% yield.

12. The method of claim 1, wherein performing the oxalate precipitation on the acid solution forms $RE_2(C_2O_4)_3 \cdot nH_2O$.

13. A method for extracting rare-earth (RE) oxide constituents from a feedstock containing RE silicates, the method comprising:

leaching the REs from the feedstock into an acid to form an acid solution by treatment of the feedstock with hydrochloric acid;

performing an oxalate precipitation on the acid solution to form an RE oxalate hydrate by treatment with oxalic acid;

separating the RE oxalate hydrate from the acid solution; and heat treating the RE oxalate hydrate to form an RE oxide having the RE elements extracted from the feedstock, wherein the heat treating includes drying and calcining the RE oxalate hydrate.

14. The method of claim 13, wherein separating the RE oxalate hydrate from the acid solution further comprises filtering and washing the RE oxalate hydrate.

15. The method of claim 13, wherein the feedstock comprises at least one of Yttrium (Y) or Ytterbium (Yb) in the form of at least one of REDS or REMS, and further comprising performing a sulfate precipitation on the acid solution that includes dissolving at least one of $Na_2SO_4$, $(NH_4)_2SO_4$, or $H_2SO_4$ in the acid solution to form a sulfate precipitate, and further comprising removing the sulfate precipitate by filtration.

16. The method of claim 13, wherein the feedstock comprises at least one of Yttrium (Y) or Ytterbium (Yb) in the form of at least one of REDS or REMS, and performing the oxalate precipitation on the acid solution is performed after performing a sulfate precipitation on the acid solution.

17. The method of claim 13, wherein the oxalic acid solution is added at room temperature and further comprising stirring the RE oxalate, followed by filtration and washing with water.

18. The method of claim 13, wherein the feedstock is a non-deposited feedstock powder including at least one of $(Y,Yb)_2Si_2O_7$ (YbYDS) or $Y_2SiO_5$ (YMS), and at least one of $(Ba,Sr)Si_2Al_2O_8$ (BSAS) or Si, and wherein the Si, Ba, Sr and Al are removed to yield a substantially pure RE oxide.

19. A system for rare-earth (RE) element collection and recovery, the system comprising:

an environmental barrier coating (EBC) fabrication and application system for applying an EBC to an object, the EBC applied as feedstock powder, wherein at least some of the feedstock powder does not deposit on the object and mixes with contaminants; and a collection and recovery system for chemically extracting the RE elements from the non-deposited powder, the collection and recovery system configured to leach the REs from the non-deposited powder into an acid to form an acid solution, perform an oxalate precipitation on the acid solution to form an RE oxalate hydrate, separate the RE oxalate hydrate from the acid solution, and heat treat the RE oxalate hydrate to form an RE oxide having the RE constituents extracted from the non-deposited powder.

20. The system of claim 19, wherein the EBC comprises Yttrium (Y) and Ytterbium (Yb) in the form of YbYDS, and the collection and recovery system is further configured to extract RE elements from the EBC as a mixed $(Y,Yb)_2O_3$.

* * * * *